DARLING & GRAY.
Cultivator.

No. 77,176.  Patented April 28, 1868.

Witnesses:
A. A. Campbell
J. C. Campbell

Inventor:
Martin Darling
Hala Gray
per F. A. Morley
atty

United States Patent Office.

MARTIN DARLING AND HALA GRAY, OF MARATHON, NEW YORK.

Letters Patent No. 77,176, dated April 28, 1868.

IMPROVEMENT IN CULTIVATOR AND POTATO-DIGGER COMBINED.

The Schedule referred to in these Letters Patent and making part of the same.

TO ALL WHOM IT MAY CONCERN:

Be it known that we, MARIN DARLING and HALA GRAY, of Marathon, in the county of Cortland, and State of New York, have invented a new and improved Cultivator and Potato-Digger Combined; and we do hereby declare that the following is a full, clear, and exact description thereof, which will enable those skilled in the art to make and use the same, reference being had to the accompanying drawings forming a part of this specification, in which—

Figure 1:
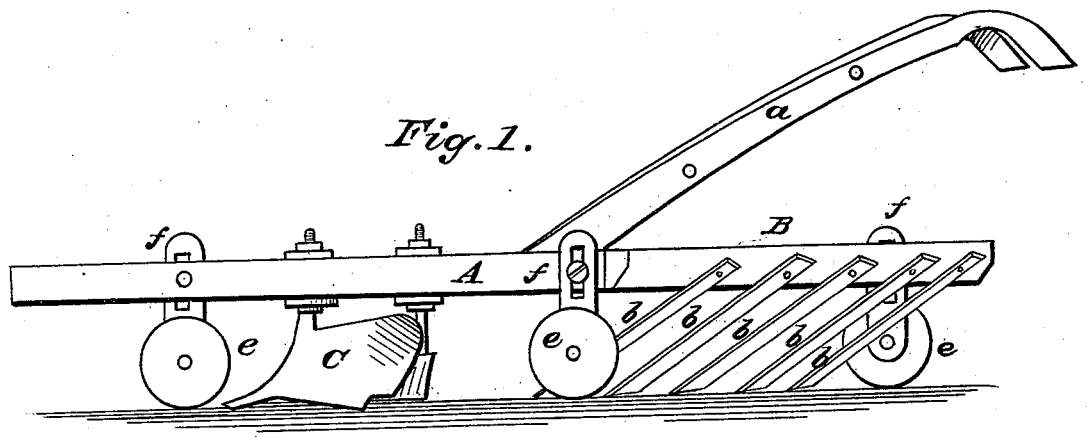
Figure 2:
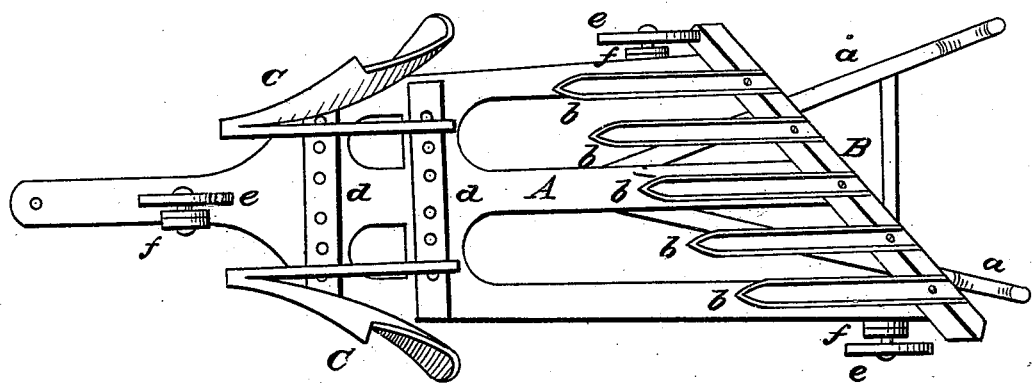

Figure 1 is a side view of my invention, and
Figure 2 is a bottom view of the same.
Similar letters of reference indicate corresponding parts.

This invention consists in an A-shaped frame, having at its rear end an oblique rake-head, or beam filled with cultivator-teeth, and at its forward end two laterally-adjustable mould-board ploughs; the frame being supported by a small wheel at each corner, as hereinafter more fully explained.

In the accompanying drawings, A B is the frame, with handles $a$; $b\ b$ are the rake or cultivator-teeth; C C are the ploughs, and $e\ e$ the supporting-wheels.

The ploughs C C are placed opposite to each other at the front of the implement, with the mould-boards outward. The frame is provided with a series of holes, $d\ d$, fig. 2, so that the standards of the ploughs may be changed from one set of holes to another, and the ploughs thus adjusted laterally. For cultivating, the ploughs are placed at a suitable distance apart, (to accommodate themselves to the distance between the drills,) to hill the plants or drills, and the cultivator-teeth $b$ cut up all weeds, &c., which pass between the ploughs, and loosen up the ground.

When the implement is used for potato-digging, the ploughs C C are made to straddle the drill, so that the sides of the drill are pared off by the ploughs, while the potatoes are thrown out by the oblique rake B $b$. In the oblique arrangement of the teeth $b$, the tendency is for the first tooth to throw the dirt and potatoes to the second tooth, and from the second to the third, &c., in such manner that the ground is stirred sufficiently to bring the potatoes to the surface. The depth of digging or cultivating is regulated by the wheels $e$, which have vertically-adjustable standards $f$. In digging, the front wheel $e$ is removed. The teeth $b$ can be placed nearer to each other than shown, and the line of teeth arranged with a greater degree of obliquity, if desired.

What we claim as our invention, and desire to secure by Letters Patent, is—

The frame A $a$, oblique cultivator-rake B $b$, laterally-adjustable ploughs C C, and adjustable supporting-wheels and standards $e\ f$, all combined, constructed, and arranged as herein shown, and for the purpose set forth.

The above specification of our invention signed by us, this 13th day of February, 1868.

MARTIN DARLING,
HALA GRAY.

Witnesses:
  A. A. CAMPBELL,
  J. C. CAMPBELL.